Dec. 4, 1951                R. P. HARSHBERGER                2,577,081
                             EPICYCLIC MECHANISM
Filed Aug. 15, 1947                                       3 Sheets-Sheet 1
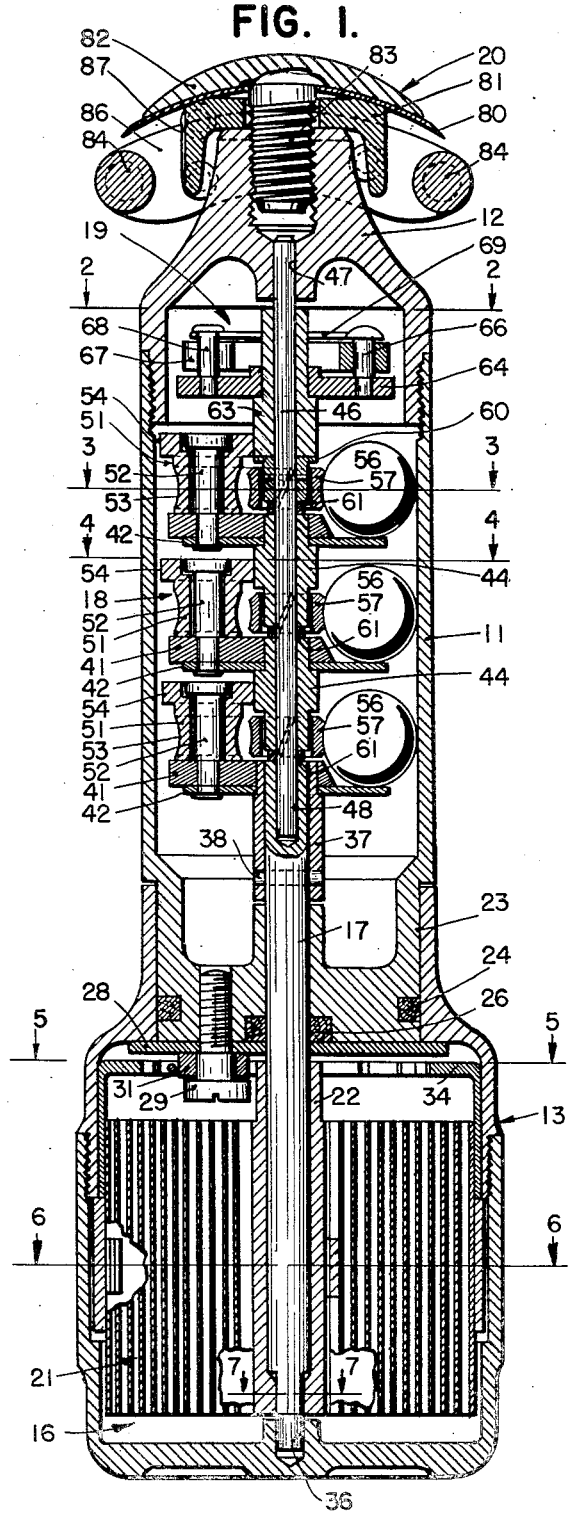
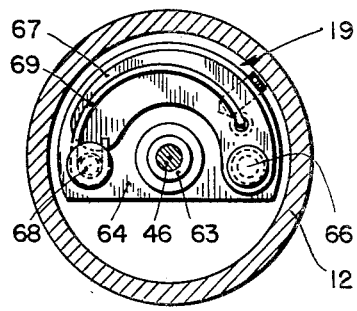
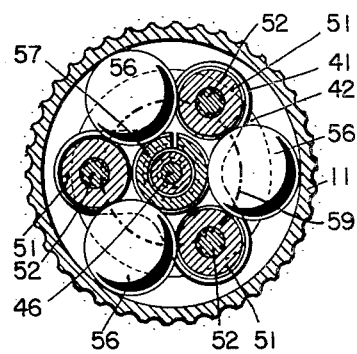
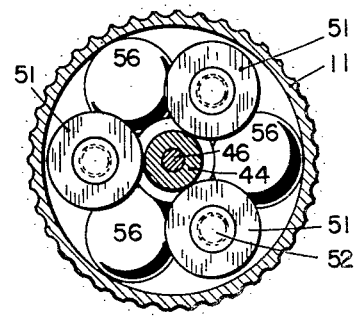
INVENTOR
RUSSELL P. HARSHBERGER
BY
ATTORNEY Dec. 4, 1951  R. P. HARSHBERGER  2,577,081
EPICYCLIC MECHANISM Filed Aug. 15, 1947  3 Sheets-Sheet 2

INVENTOR
RUSSELL P. HARSHBERGER
BY
ATTORNEY

Dec. 4, 1951 — R. P. HARSHBERGER — 2,577,081
EPICYCLIC MECHANISM
Filed Aug. 15, 1947 — 3 Sheets-Sheet 3

INVENTOR
RUSSELL P. HARSHBERGER
BY
ATTORNEY

Patented Dec. 4, 1951

2,577,081

UNITED STATES PATENT OFFICE 2,577,081

EPICYCLIC MECHANISM

Russell P. Harshberger, Los Angeles, Calif.

Application August 15, 1947, Serial No. 768,902

11 Claims. (Cl. 74—798)

The present invention relates to power-transmitting mechanisms generally and particularly to an improved power-transmitting epicyclic mechanism adapted to transmit power with minimum frictional losses. More specifically the invention comprises a speed-increasing epicyclic mechanism designed to transmit relatively small quantities of power with minimum frictional losses and incorporating frictional contacting elements in place of the usual intermeshing gears.

The invention is applicable particularly to vibrating razors but it is to be understood that its use is not so limited. Applicant's co-pending application Serial No. 755,405, filed June 18, 1947, discloses and claims an improved epicyclic mechanism of the type to which the present invention relates. In that application, as in the present, the construction is designed to make possible the transmission of small quantities of power at speeds ranging from the relatively slow to the relatively high and with a minimum of frictional losses. When the power transmitted is small frictional losses become magnified in importance, and to provide a suitable transmission mechanism it has been the practice to make use of machined parts and gears having an accuracy approaching that found in the parts of a watch. Parts so made are relatively expensive and also are subject to the inherent objection that with wear they lose their accuracy and become noisy and inefficient.

The apparatus embodying the present invention is characterized in that machine parts which must be made with extreme accuracy and which, accordingly, are expensive to make have been eliminated and in their place have been substituted commonplace shapes adapted to be made more easily and cheaply with accuracy, as for example, cylinders and balls. Gear teeth in particular have been eliminated. Additionally, the disadvantages accruing from wear have been largely eliminated by so constructing and arranging the parts as to provide take-ups which function continuously and which are capable of eliminating play due to wear without functional change.

With an appreciation of the defects and shortcomings of the constructions of the prior art, and in order to provide a more economically manufactured mechanism having the same or even greater capabilities, it is an object of the present invention to provide an improved epicyclic speed-increasing mechanism capable of transmitting relatively small quantities of power with minimum frictional losses and with an absence of the usual gearing found in standard mechanisms of this type.

It is another object of the invention to provide an epicyclic mechanism in which an automatic take-up is effected by transmitting force through a rotating member, the rotational center of which moves upon a path positioned radially between the rotational centers of two cooperating rotating members.

Another object of the invention is to provide an epicyclic mechanism incorporating an epicyclic train in which the planet members comprise rotating balls.

A still further object of the invention is to provide an epicyclic mechanism incorporating an automatic take-up in which each planet unit comprises a relatively displaceable planet ball and a planet roller which are wedged by their own rolling contact between an encircling track and a cooperating sun roller.

A further object of the invention is to provide epicyclic roller trains including cooperating planet rollers which frictionally engage each other, a sun roller, and an enclosing track, respectively.

A still further object of the invention is to provide an epicyclic mechanism in which a roller train includes a pivotally mounted planet roller resiliently urged into contact with a sun roller and an enclosing track.

These and other more specific objects will appear upon reading the following specification and claims and upon considering in connection therewith the attached drawings to which they relate.

Referring now to the drawings in which preferred embodiments of the present invention are disclosed:

Figure 1 is a longitudinal section through a vibrating razor embodying an epicyclic mechanism constructed in accordance with the first preferred embodiment of the present invention;

Figure 2 is a transverse section upon the line 2—2 of Figure 1, showing the rotary vibrator-governor;

Figure 3 is a transverse section upon the line 3—3 of Figure 1 and illustrates the relationship of the planet balls and rollers;

Figure 4 is a section upon the line 4—4 of Figure 1;

Figure 5:
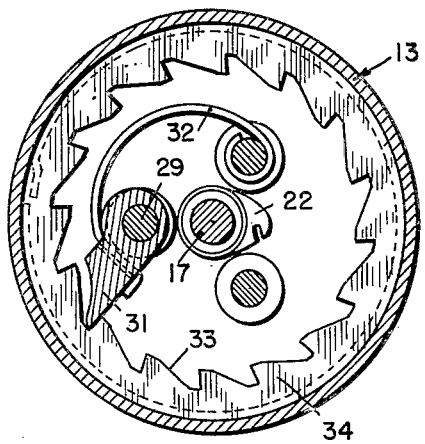
Figure 5 is a section upon the line 5—5 of Figure 1 and illustrates the motor-locking pawl and rack arrangement.
Figure 8:
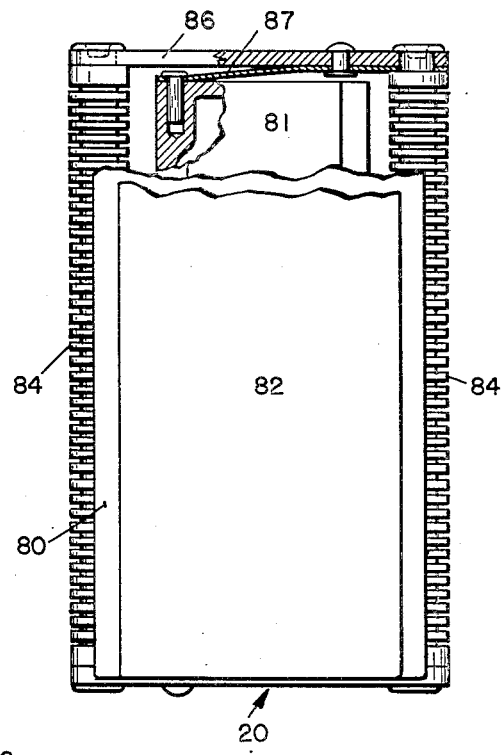
Figure 8 is a view of the operating end of the razor incorporating the present invention.
Figure 6:
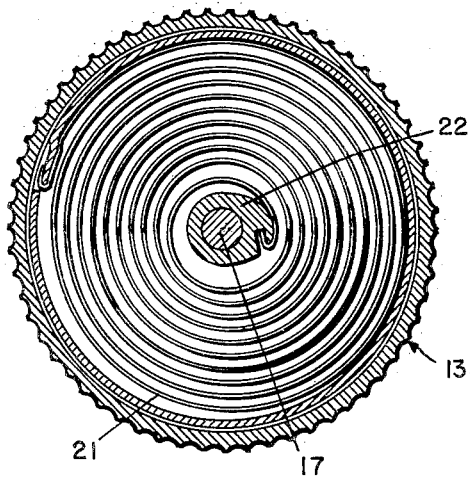
Figure 6 is a transverse section through the spring motor upon the line 6—6 of Figure 1.

Referring again to the drawings, and to Figures 1 to 8, inclusive, in particular, there is illustrated an epicyclic mechanism constructed in accordance with the first preferred embodiment of the invention incorporated into a razor of the vibratory type. The illustrated razor is seen to comprise a body including a central tubular casing 11, to one end of which is threaded a head 12, and which carries, at its opposite end, a rotatable hollow handle 13. The spring driving motor, indicated generally by the reference character 16, is located within the handle 13 and its shaft 17 extends into the casing 11 to transmit power to the epicyclic mechanism located therein, and indicated generally by the reference character 18. The vibrator-governor to control the amplitude and frequency of vibration is indicated generally by the reference character 19 and is located within the head 12 to which a blade-mounting unit 20 is removably attached.

Figure 7:
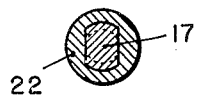
Figure 7 is a section upon the line 7—7 of Figure 1.

Referring now to the motor unit 16 and its related structure, it is seen to include a coiled flat spring 21 secured fixedly at its inner end to a sleeve 22 and rotatably mounted upon the longitudinal shaft 17 by virtue of the interfitting non-circular sections best illustrated in Figure 7. The forward part of the handle 13 is reduced forwardly of the spring 21 and rotatably encloses the reduced cylindrical surface 23 of casing 11. To prevent moisture from entering the motor casing and also to provide lubricating means for the sliding surfaces suitable seals 24 and 26 are provided in the surface 23 and around the shaft 17. To provide means by which entrance may be gained to the interior of handle 13 the latter is preferably formed of two threadedly connected telescoping parts, the separation of the handle from the casing 11 being prevented by the presence of a locking plate 28 secured to the casing end wall by one or more screws 29.

Energy is stored in the motor spring 21 by turning the hollow handle 13 relative to casing 11, a relative rotation which is permitted in one direction under a manually exerted force and which is prevented in the opposite direction. The means which permit this relative rotation in one direction only comprises a pawl 31 pivoted upon a screw 29 and urged by a spring 32 into engagement with the teeth 33 formed in a radially spaced rack 34 fixed interiorly of the handle 13 and positioned concentrically of shaft 17. The rack teeth 33 are shaped to enable the rack and the attached handle 13 to rotate in one direction relative to the pawl, in which direction the pawl slides thereover, but to provide a locking engagement with the pawl to prevent handle rotation in the opposite direction.

The rearward extremity of motor shaft 17 is rotatably seated at 36 in the end wall of handle 13 and extends forwardly to seat rotatably the end wall of casing 11, its forward end within that casing carrying a sleeve 37 to which it is connected by a transverse pin 38. Sleeve 37 forms the driving connection between the motor shaft and the epicyclic mechanism 18.

The epicyclic mechanism 18 constructed in accordance with the first preferred embodiment of the invention is illustrated as incorporating three epicyclic trains, although it is to be understood that the exact number of units is not of the essence. These trains are identical, except as specifically pointed out, and each is seen to comprise a planet carrier 41, including a backing plate 42. Each carrier, excepting that of the first train adjacent motor 16, is fixed to a central sun roller 44 provided with a longitudinal bore and mounted rotatably upon a shaft 46 the ends of which are fixed in seats 47 and 48 located, respectively, in the head 12 and in the inner end of motor shaft 17. In the case of the train nearest motor 16 the planet carrier 41 is fixedly mounted upon the sleeve 37 previously described.

Each train also includes three arcuately spaced planet rollers 51 rotatably mounted upon pins 52 fixed to the carriers 41. The bore of each roller 51 is somewhat greater in diameter than its carrying pin 52 to provide a loose fit so that it is permitted limited displacement. As is clearly seen in the drawing, each planet roller is formed externally with a concave cylindrical surface 53 which extends for a portion of its length, and with a longitudinally spaced flat cylindrical surface 54 adapted to roll in contact with the sun roller 44 fixed to the carrier of the adjacent train. Each train also includes a plurality of planet balls 56, three in the illustrated form, spaced intermediate the planet rollers 51, as is illustrated most clearly in Figures 3 and 4. The balls 56 of each train roll in contact with the inner surface of casing 11, formed as an enclosing track, and are held against that surface by ring 57 encircling each sun roller 44 in spaced relationship. Ring 57 is slightly compressed by the balls and its natural resilience provides an outward radial force to hold the balls in rolling contact with the encircling annulus. The rings 57 are preferably split diagonally rather than axially, as illustrated in dotted lines in Figure 1, to provide a smoother rolling surface.

The supporting pins 52 of the planet rollers 51 are so spaced radially from the central longitudinal axis of rotation comprising the shaft 46, and the concave surfaces 53 of the rollers are so dimensioned that each planet roller 51 contacts the adjacent planet balls 56 at a point positioned radially inside a circle through the centers of the balls. A dotted circle drawn through these points of contact is indicated in Figure 3 by the reference character 59. The relationship is such that the rollers 51 under the force exerted by the carrier 41 tend to force themselves between the balls and the axis of rotation, thereby forcing their own cylindrical surfaces 54 into contact with the sun roller 44 of the adjacent train. It is clear that, sufficient play being permitted between each roller 51 and its supporting shaft 52, an appreciable amount of wear in the rolling surfaces can be accommodated without in any way affecting the rolling contact of the parts.

The individual trains are spaced from each other by spacer rings 61 positioned between the adjacent ends of the sun rollers 44 and encircling the stationary shaft 46.

The train nearest the operating end 20 of the razor drives the vibrator-governor 19, the governor itself being provided with a sleeve 63 corresponding to the sun rollers 44 and similarly mounted upon the shaft 46 on which the governor plate 64 is fixedly mounted for rotation. To prevent the transmission of any end thrust from the preceding trains to the sleeve or sun roller 63 a collar 60 is fixed to the shaft 46 immediately adjacent thereto, being positioned largely within the spring ring 57. In the governor itself a rivet 66 pivotally carries an off-center weighted element 67 normally urged inwardly, until its inner end contacts a second rivet 68, by a spring 69 carried by rivet 63 and attached to the element. The entire governor unit 19 is unbalanced relative to the axis of rotation comprising shaft 46 so that its rotation effects the vibration of the end of the razor at which it is positioned. It also performs a speed-limiting function in that upon reaching a predetermined speed of rotation centrifugal force moves the weighted element 67 outwardly until its surface makes rubbing contact with the adjacent enclosing surface of head 12. A braking action is thus provided to effect a reduction in speed and, accordingly, a limiting control upon the speed of rotation and so the amplitude of vibration.

The mounting unit 20 for the razor blade 80 is positioned, as previously mentioned, forwardly of the head 12, and comprises a blade-centering bed 81 and a clamping head 82 provided centrally with a threaded pin 83 seated in threaded relationship with the internally threaded end of casing head 12. The razor blade 80 is removably clamped between the clamping head 82 and bed 81 in a manner which is common to safety razors of the double-edge type and may be removed from its operative position, illustrated in Figures 1 and 8, by unscrewing the body 11 from the mounting unit 20, that is, screwing screw 83 out from the head 12. Thereupon the clamping head and the bed may be separated and the blade removed in a common and well known manner.

The exact construction of the blade-mounting unit 20 is not a part of the present invention but in the preferred form illustrated is seen to comprise parallel guards 84 positioned at the side and slightly below the cutting edges of the blade 80. The guards are interconnected at their ends by end members 86, themselves flexibly connected to the adjacent bed 81 for a limited longitudinal movement by means of flat springs 87.

Figure 9:
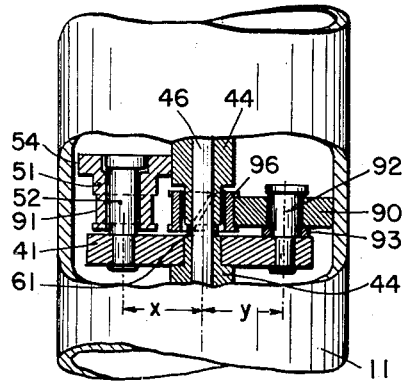
Figure 9 is a partial section through an epicyclic mechanism constructed in accordance with the second preferred embodiment of the invention.
Figure 10:
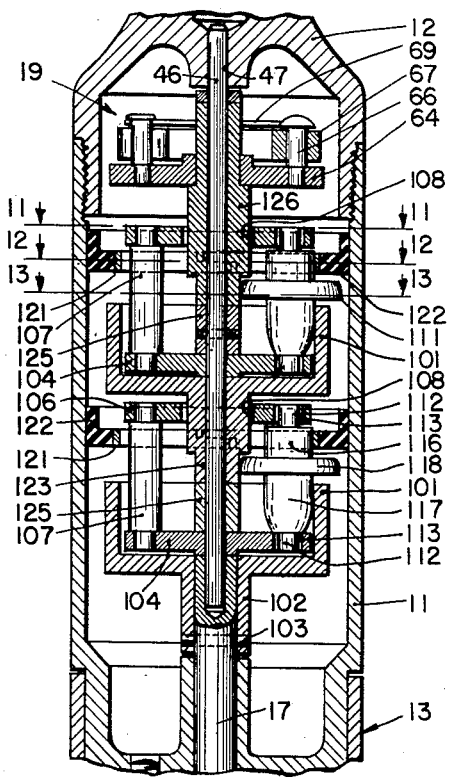
Figure 10 is a partial longitudinal section through a third preferred embodiment of the invention.
Figure 11:
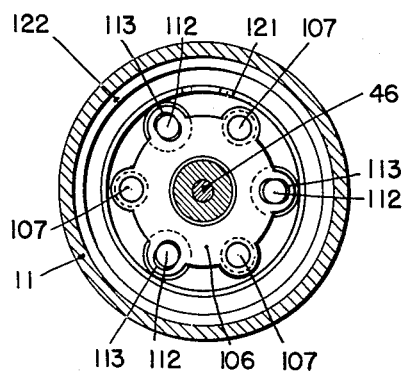
Figure 11 is a transverse section upon the line 11—11 of Figure 10.
Figure 12:
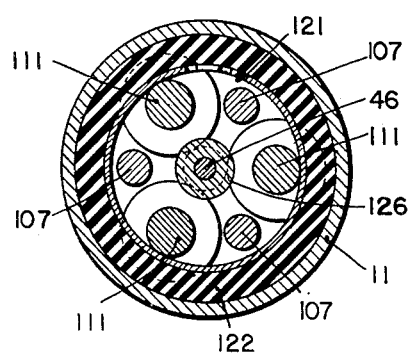
Figure 12 is a similar section upon the line 12—12 of Figure 10.
Figure 13:
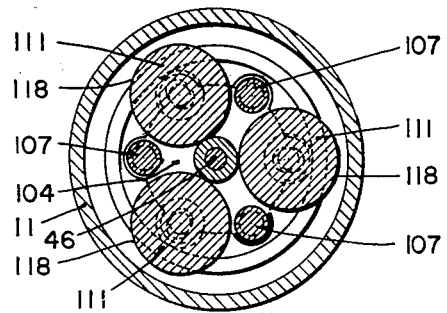
Figure 13 is a transverse section upon the line 13—13 of Figure 10.

The epicyclic mechanism comprising the first preferred embodiment of the invention as illustrated in Figures 1 to 8, inclusive, may be replaced by a second form which is illustrated in Figure 9 and which is to be understood as being identical to that first described form except as to details specifically referred to. In the second embodiment of the invention the planet balls 56 are eliminated and in their place are substituted planet rollers 90, which may be referred to as outer planet rollers, carried by pins 92 fixed to the planet carrier 41 which in the present instance is without the backing plate 42 of the first embodiment, it no longer being needed to contact the balls 56. The central bore of each roller 90 is larger than its supporting pin 92 to permit lateral displacement in the manner of the planet rollers 51, which may be referred to as inner planet rollers, which contact the sun roller 44. Preferably spacing rings or washers 93 are provided between each outer planet roller 90 and the adjacent carrier plate 41.

In this embodiment, as in the first, shaft-enclosing split spring rings are provided. These rings are here indicated by the reference character 96 and are substantialy duplicates of their counter-parts 57 in the first embodiment with the exception that their outer surfaces are shaped to conform to the surfaces of the outer planet rollers 90 rather than being concave and so adapted to roll with the balls 56 of the first embodiment. In the first embodiment the planet balls 56 made rolling contact with the encircling annulus or track formed by the inner surface of the casing 11 and also contacted the planet rollers 51. In this embodiment the place of the balls is taken by the outer planet rollers 90 which also make rolling contact with the inner surface of the casing 11, against which they are spring pressed by the resilient spring rings 96. Rollers 90 also make contact with the adjacent inner planet rollers 51 the surfaces 91 of which are shaped to contact therewith. Also in a relationship similar to that present in the first embodiment in which the rollers 51 contacted the balls 56 at points lying within a circle through the centers of the balls the radial distance "$x$" of the pins 52 of the inner planet rollers 51 is less than the radial distance "$y$" of the pins 92 carrying the outer planet rollers 90. The result, as in the first embodiment, is that the inner rollers 51 tend to wedge themselves between the outer planet elements and the adjacent sun roller 44, a result made possible to a slight degree by the fact that in each instance the planet rollers 51 and 90 are loosely mounted upon their supporting pins.

Referring now particularly to Figures 10 to 13, inclusive, a third preferred embodiment of the invention is illustrated and is also to be understood to be similar to the first embodiment except as to details specifically referred to. In this embodiment two trains are employed, although a greater number can be included if desired. Referring first to the train nearest the driving shaft 17, a cup-shaped annulus 101 is seen to be provided with a reduced central sleeve 102 which encloses and is connected by a transverse pin 103 to shaft 17. The planet carrier comprises a plate 104 rotatable upon the stationary shaft 46, and a second plate 106 spaced axially therefrom and connected rigidly thereto by arcuately spaced axially extending pins 107, of which there may be three or more if desired. The second plate 106 of the planet carrier is provided centrally with a bore 108 so that it encircles in spaced relationship the shaft 46 and other parts mounted thereon.

Extended between the plates 104 and 106 and interspaced between the connecting pins 107 are planet rollers 111, each of which includes pins or stub shafts 112 at its ends rotatably positioned in seats 113 in the carrier plates 104 and 106. The relative sizes of the shafts 112 and the seats 113 permit limited displacement and tilting between the ends of the planet rollers. Each roller includes a cylindrical surface 116 adjacent the carrier plate 106, a second cylindrical surface 117 having a rounded end adjacent the second carrier plate 104, and an intermediate surface 118 of larger diameter which is contoured so that in a longitudinal plane its distance from its axis of rotation comprising the pins 112 is less adjacent the surface 116 than it is adjacent the surface 117. Cylindrical surface 117 makes rolling contact with the inner surface of the encircling cup-shaped annulus 101, while the second cylindrical surface 116 makes rolling contact with an encircling split metallic ring 121, having overlapping ends as is shown in dotted lines in Figure 10, which is mounted upon the interior circumference of a resilient ring 122 carried by casing 11.

The second train is identical to that which has just been described with the exception that its cup-shaped annulus 101 is provided centrally with a sun roller 123 in place of the sleeve 102 of the first train, a spacing sleeve 125 being positioned adjacent the end thereof, and the planet rollers 111 rolling in contact therewith under the pressure exerted by the resilient ring 122 acting through the split metallic ring 121.

Forward of the second train is positioned the vibrator-governor 19 constructed as in the first embodiment with the exception that its carrying plate 64 is fixedly mounted upon an extended sleeve 126 which functions as a sun roller and is contacted by the surface 118 of the planet rollers 111 of the second train. A sleeve 125 pin-connected to shaft 46 spaces sleeve 126 and plate 104 of the adjacent train to take any end thrust.

The operation of the various forms of the device are believed to be clear from the foregoing. Referring first to the embodiment of the invention illustrated in Figures 1 to 8, inclusive, upon the winding of the spring motor 16 the spring is held in its wound position by the latching of the pawl 31 with the teeth 33. The spring force is released through the motor shaft 17 by which it is transmitted to the sleeve 37 connected to the first roller train, and particularly to the carrier 41 thereof. The rotation of carrier 41, at approximately one revolution per minute, effects the circular travel of the pins 52 which loosely mount the planet rollers 51. The centers of pins 52 travel on a circle which is slightly within the centers of the planet balls 56 and as a result the balls are forced outwardly and roll in contact with the inner surface of the casing 11. Planet rollers 51 are rotated by their contact with the balls, and at a higher speed being of smaller diameter at their point of contact, and are forced inwardly by the balls into contact with the adjacent sun roller 44, the contacting surface 54 of the planet rollers being of larger diameter than the diameter of the sun roller, again effects an increase in the speed of rotation. During this operation the spring rings 57 at all times urge the balls 56 outwardly against the encircling casing 11 with sufficient force to prevent slipping and also function to center them longitudinally.

Each train increases the speed of rotation of the sun roller of the adjacent train above that of its own sun roller until finally the sun roller 63 rotating with the vibrator-governor 19 rotates at a speed which is approximately 1500 times as fast as the speed of rotation of the shaft 17. This ratio can, of course, be varied by changes of diameters. Any wear which takes place in the surfaces is accommodated by the expansion of the planet springs 57 and by the loose mounting of the planet rollers 51 upon their carrying pins 52.

Referring now to the second embodiment of the invention, its operation is similar to that of the first described embodiment with the exception that it is the outer planet rollers 90 which rotate in contact with the inner surfaces of the enclosing casing 11, and which in turn impart their rotational speed to the smaller diameter surface 91 of the inner planet rollers 51. Both the outer planet rollers 90 and the inner planet rollers 51 are mounted for displacement upon their carrying pins 92 and 52, respectively, and the ability to compensate for wear is similar to that of the first embodiment.

Referring now specifically to the third embodiment of the invention, the rotary movement of the motor shaft 17 is transmitted to the cup-shaped annulus 101 which rotates in contact with the cylindrical surfaces 117 of the planet rollers 111 of the first train. The surface 117 of the planet roller is forced into contact with the inner surface of the annulus 101 by the action of the resilient ring 122 which exerts an inward radial force upon the cylindrical surfaces 116 of the planet rollers to effect a cantilever tilting action about the large diameter surface 118 at its point of contact with the sun roller 123. It is seen that the resilient ring 122 effects contact of the planet rollers at three points. The tilting movement of the planet rollers is possible for the mounting pins 112 of the rollers are smaller in diameter than the radial dimension of their mounting seats 113 in plates 104 and 106. The contour of the planet surface 118 also permits this tilting movement without loss of contacting surface as does the rounded end of the cylindrical surface 117. Clearly, an increase in speed of rotation is obtained by the contact of the relatively large diameter inner surface of annulus 101 with the smaller diameter surface 117 of planet roller 111. The rotation of the planet roller is effective, by virtue of the contact of its cylindrical surface 116 with the split metallic ring 121, to drive the planet carrier comprising the plates 104 and 106 in the reverse direction to the direction of rotation of the annulus 101, and a still further multiplication is obtained by the contact of the relatively large diameter surface 118 of the planet rollers with the smaller diameter surface of the sun roller 123 fixed to the adjacent train. A further speed-increasing factor is effected in that the driven sun roller fixed to the annulus of the adjacent train is driven in the same direction of rotation as the planet carrier of the preceding train. As described, the vibrator-governor 19 is also provided with its sun roller 126 which is driven by the planet rollers of the second or last train, a multiplication of speed being accomplished through each of the trains and it being possible to incorporate as many trains as desired.

In this embodiment, as in the previous embodiments, wear is compensated for by the adjustability of the parts, the tiltable mounting of the planet roller 116 under the force exerted by the resilient ring 122 accommodating any wear which takes place in the parts.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an epicyclic mechanism, a plurality of cooperating roller trains, each comprising a rigid planet carrier, planet elements carried by said carrier, and a rigid sun roller; an enclosing cylindrical surface positioned as to be engaged by planet elements, means supporting said planet elements for displacement on said carrier, and a resilient ring positioned radially within said planet elements and exerting an outwardly directed radial force to move said elements into engagement with said enclosing surface, and means to transmit the rotative force of said planet elements to said sun roller.

2. In an epicyclic mechanism, a plurality of cooperating roller trains, each comprising a rigid planet carrier, planet elements carried by said carrier, and a rigid sun roller; an enclosing cylindrical surface positioned as to be engaged by certain of said planet elements, said planet elements including a rigid ball, and means including certain other of the planet elements to force said ball against said enclosing surface said last-named means including a rigid roller planet element carried by said carrier.

3. In an epicyclic mechanism an encircling annulus, a sun roller positioned radially within the projection of said annulus, a carrier rotatably disposed relative to said annulus, and a plurality of planet elements rotatable with said carrier including a ball in rolling contact with said annulus and a roller mounted for rotation about its own axis and for limited displacement, said roller being so positioned with respect to said ball and to said sun roller as to exert a wedging action therebetween upon rotation as to force said ball against said annulus.

4. In an epicyclic mechanism an encircling annulus, a sun roller positioned radially within the projection of said annulus, a carrier rotatably disposed relative to said annulus, a plurality of planet balls rotatable with said carrier and in contact with said annulus, a plurality of planet rollers rotatable with said carrier interspaced with said balls, said planet rollers being mounted for limited displacement relative to their supporting axis of rotation and so positioned as to wedge between an adjacent ball and said sun roller upon rotation of said carrier.

5. In an epicyclic mechanism, an encircling annulus, a sun roller positioned radially within the projection of said annulus, a carrier rotatably disposed relative to said annulus, a plurality of planet balls rotatable with said carrier and in contact with said annulus, a resilient spring race exerting a radial force to urge said balls against said annulus, a plurality of planet rollers rotatable with said carrier radially outside said spring race and interspaced with said balls, said planet rollers being mounted for limited displacement relative to their supporting axis of rotation and so positioned as to wedge between an adjacent ball and said sun roller upon rotation of said carrier.

6. In an epicyclic mechanism, a plurality of cooperating roller trains, each comprising a planet carrier, planet elements carried by said carrier, and a sun roller; an encircling casing positioned as to be contacted by planet elements of said trains, said planet elements including balls in contact with said enclosing casing and rollers rotatable about individual arcuately spaced axes interspaced between said balls, said rollers contacting said balls at points spaced radially inside the orbit of travel of the ball centers to exert a wedging force thereagainst to force them against said enclosing casing and to be forced by said balls against a cooperating sun roller.

7. In an epicyclic mechanism, a rigid encircling annulus, a rigid sun roller positioned within said annulus, a carrier rotatably disposed relative to said annulus, and a plurality of rigid planet elements rotatable with said carrier and relatively shiftable radially relative thereto, said planet elements including a roller in rolling contact with said annulus and a second roller mounted for rotation in simultaneous contact with said first-mentioned roller and with said sun roller.

8. In an epicyclic mechanism of the type including a rigid encircling cylindrical surface, a rigid sun roller rotatable about a central longitudinal axis, a rigid planet element having a surface in contact with said cylindrical surface, a rigid planet element rotatable in contact with said sun roller, resilient means exerting a force normal to said axis to hold said first-mentioned planet element in contact with said cylindrical surface, and a carrier mounting said planet elements for conjoint revolution about said axis and for rotation about their own axes in rolling contact with each other.

9. The construction recited by claim 8 characterized in that one of said planet elements is mounted for limited translation relative to said carrier and in that the other of said planet elements makes contact with said one element at a point spaced radially from a circle about said axis including said point whereby upon rotation of said carrier said other planet element exerts a radial wedging force upon said one element.

10. The construction recited in claim 9 characterized in that said first-mentioned planet element is moutned for limited translation relative to said carrier and in that said second-mentioned planet element makes contact with said first-mentioned planet element at a point radially within the orbit of travel of the center of said first-mentioned planet whereby to effect an outward wedging action to force said first-mentioned planet element against said cylindrical surface upon rotation of said carrier.

11. The construction recited in claim 10 characterized in that said first-mentioned planet element is a ball and in that said second-mentioned planet element is a roller.

RUSSELL P. HARSHBERGER.

REFERENCES CITED

The following references are of record in the file of this patent:

UNITED STATES PATENTS

| Number | Name | Date |
| --- | --- | --- |
| 1,298,560 | Poppink | Mar. 25, 1919 |
| 1,368,570 | Philippean | Feb. 15, 1921 |
| 1,399,442 | Rennerfelt | Dec. 6, 1921 |
| 1,986,177 | Zastoupil | Jan. 1, 1935 |
| 2,293,407 | Schirrmeister | Aug. 18, 1942 |
| 2,344,078 | Brissonet | Mar. 14, 1944 |
| 2,383,107 | Cherry | Aug. 21, 1945 |

FOREIGN PATENTS

| Number | Country | Date |
| --- | --- | --- |
| 52,181 | Sweden | Jan. 22, 1917 |
| 349,137 | Great Britain | May 28, 1931 |
| 485,820 | France | Nov. 16, 1917 |
| 593,312 | France | May 20, 1925 |